July 18, 1933. J. B. PIERCE, JR 1,919,036
MANUFACTURE OF HYDROGEN PEROXIDE
Filed May 16, 1928
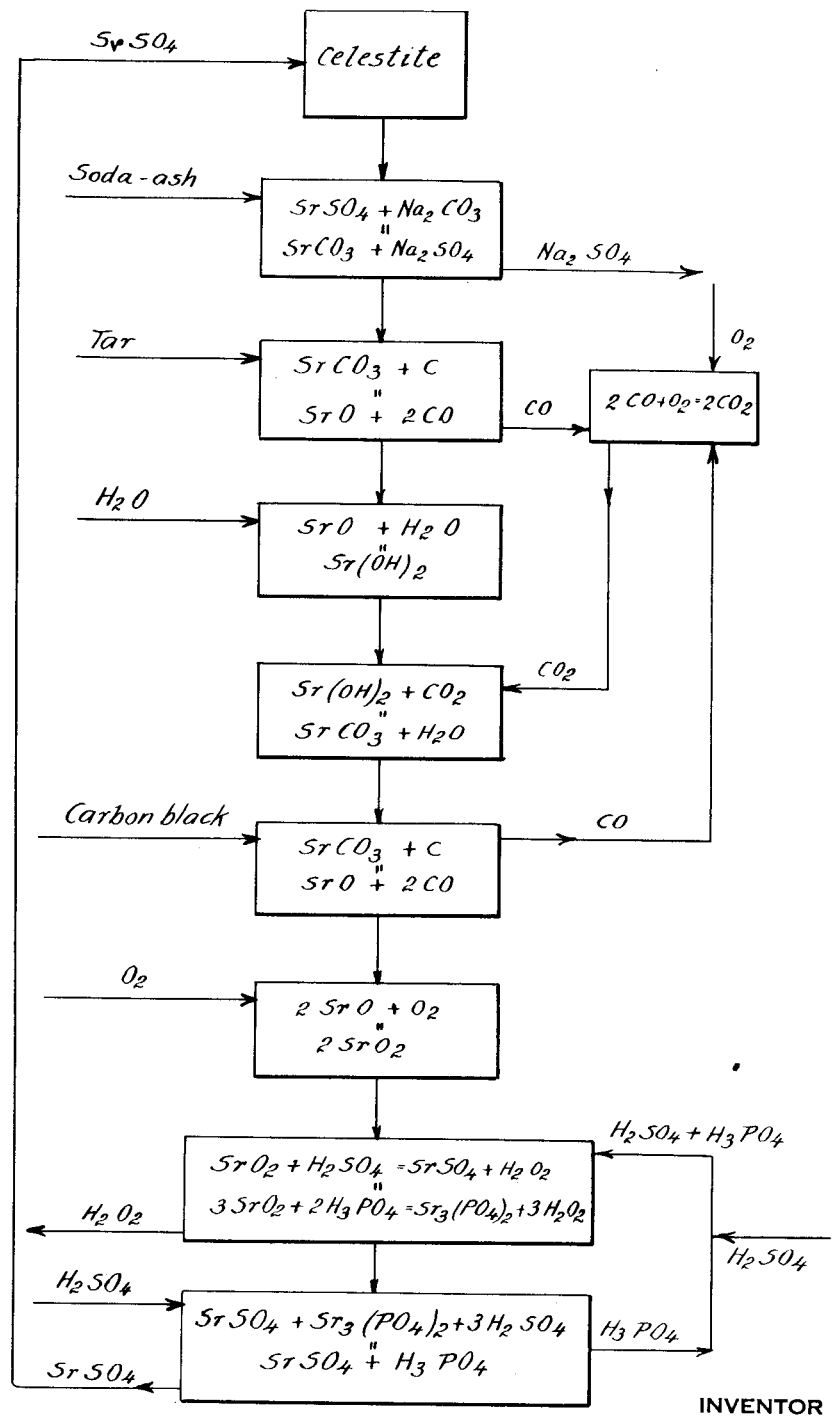
INVENTOR
James B. Pierce, Jr.
BY
ATTORNEYS Patented July 18, 1933

1,919,036

UNITED STATES PATENT OFFICE

JAMES B. PIERCE, JR., OF CHARLESTON, WEST VIRGINIA, ASSIGNOR TO BARIUM REDUCTION CORPORATION, A CORPORATION OF DELAWARE

MANUFACTURE OF HYDROGEN PEROXIDE

Application filed May 16, 1928. Serial No. 278,354.

This invention relates to the manufacture of hydrogen peroxide and has for its object certain improvements in the method of manufacturing hydrogen peroxide. The invention also contemplates the recovery and use of certain valuable by-products in the manufacture of hydrogen peroxide.

Various processes are employed in the making of hydrogen peroxide. The great difficulty confronting manufacturers of hydrogen peroxide is that of obtaining a product of uniform and high purity, not to mention the question of cost. In the heretofore customary practice, a final product of high purity is not readily obtained. Certain impurities persist in accompanying the product in its conversion from the raw starting material to the finished product. Moreover, these impurities can only be removed with considerable effort, if at all, and by costly procedures. The materials going into the process are utilized but once, and fresh materials must be employed to continue the process. There is, therefore, a marked need for an improved method of manufacturing hydrogen peroxide.

According to my invention it is possible to manufacture hydrogen peroxide of high purity. The invention, moreover, contemplates certain economies, such as the recovery in marketable form of valuable by-products, the regeneration of certain of the reagents employed, etc., which makes it possible to combine purity of product with economy of manufacture. The process may be made substantially cyclic.

In accordance with the practice of my invention hydrogen peroxide may be manufactured by subjecting an appropriate metallic compound carrier of oxygen to the action of a suitable acid. A water soluble salt of that acid is also formed which may be suitably treated to regenerate the acid and to renew the carrier of oxygen, both of which may be re-employed in the further manufacture of hydrogen peroxide.

The principles of my invention will be better understood by considering in some detail the practice of the same during the successive steps leading from the raw starting materials to the finished product. In my present preferred practice of the invention, I employ the mineral celestite (native strontium sulfate, $SrSO_4$) as the raw starting material. The celestite is preferably crushed and pulverized to a suitable particle size. The finely divided particles of celestite are then subjected to a tabling, jigging or flotation operation in order to secure a concentrate of strontium sulfate as free as possible from gangue constituents.

The celestite concentrates are charged into a suitable receptacle to which is added a concentrated solution of soda ash ($Na_2CO_3$). The soda ash liquor contains about 25% sodium carbonate in solution. The pulp mixture of strontium sulfate particles and sodium carbonate liquor is heated and brought to its boiling point. As a result of the reaction, strontium carbonate and sodium sulfate are formed:

(1) $SrSO_4 + Na_2CO_3 = SrCO_3 + Na_2SO_4$

The speed and thoroughness of the reaction are materially aided by the finely divided particle size of the celestite. Due to the enormous surface area offered by the great number of minute particles, the sodium carbonate liquor can attack the strontium sulfate particles more readily. Substantially all of the available strontium sulfate is converted to strontium carbonate.

The heated mixture of strontium carbonate and sodium sulfate is then gradually cooled. The strontium carbonate settles to the bottom as a crystalline precipitate, while the sodium sulfate liquor gathers as a top layer. After all of the strontium carbonate crystals have settled out, the sodium sulfate liquor may be withdrawn, for example by decantation. This liquor may be used as such, or it may be evaporated to dryness in order to collect the sodium sulfate crystals. Both the liquid and solid forms are adapted for certain commercial applications. In this manner a valuable by-product in the manufacture of hydrogen peroxide is obtained.

The strontium carbonate crystals that have been separated from the sodium sulfate liquor are washed free of sodium sulfate. This may be accomplished by washing or leaching the strontium carbonate particles with water. After a suitable number of washings to remove any entrained sodium sulfate liquor, the crystals or solids of strontium carbonate are preferably filter-pressed and dried. For purposes of convenience, this strontium carbonate product may be referred to as crude strontium carbonate.

It is next desired to convert the crude strontium carbonate to strontium oxide. In order to obtain this conversion, the crude strontium carbonate, together with a suitable carbonaceous reducing agent, such as coal, tar, or the like, is subjected to a smelting or reduction operation. The mixture of crude strontium carbonate and carbonaceous reducing agent may be subjected to the reduction step in the form of a loose, agglomerated, or briquetted charge. The reduction step is preferably conducted with the use of 12 to 20% by weight of the reducing agent, and the mixture is heated to a temperature of about 1200° C. in a suitable reduction chamber, such as a rotating or muffle furnace. The charge may be directly or indirectly heated. The time required varies from six to twelve hours, depending upon the operating conditions. If the reduction operation is carefully performed, substantially all of the available strontium carbonate is reduced to strontium oxide, according to the following reaction:

(2)    $SrCO_3 + C = SrO + 2CO$

The resulting strontium oxide, which may be referred to as crude strontium oxide, is next leached with water in order to obtain a solution of strontium hydroxide of convenient strength, say 6% to 10%. Hydrolysis of the strontium oxide results when water is added thereto, in conformity with the following reaction:

(3)    $SrO + H_2O = Sr(OH)_2$ $$or\ Sr\begin{matrix}\diagup OH \\ \diagdown OH\end{matrix}$$

Relatively pure carbon dioxide is then passed into the strontium hydroxide, in order to precipitate out the strontium as strontium carbonate, according to the reaction:

(4)    $Sr(OH)_2 + CO_2 = SrCO_3 + H_2O$

The carbon dioxide gas necessary to carbonate the strontium hydroate may conveniently be secured as a by-product in the reduction operation of the crude strontium carbonate to strontium oxide, according to equation (2) above. During this reaction, carbon monoxide gas is formed. This carbon monoxide may be readily transformed to carbon dioxide by burning the same in air.

(5)    $2CO + O_2 = 2CO_2$

Moreover, the carbon dioxide gas obtained in this manner may be augmented by the carbon dioxide gas obtained from the heated carbonaceous reducing agent employed in the reduction operation just mentioned. In other words, some of the carbon in the carbonaceous reducing agent, when subjected to the reduction temperature, is promptly converted to carbon dioxide gas, quite independent of the reaction taking place between the strontium carbonate and carbon:

(6)    $C + O_2 = CO_2$

The combined carbon dioxide gases are carefully scrubbed, such as by passing them through a body or spray of water, in order to remove impurities:

The strontium carbonate, precipitated in accordance with equation (4) above, is filtered from its accompanying liquor, washed, dried, and disintegrated. Unlike the strontium carbonate obtained in the soda ash treatment of the raw celestite, as shown in equation (1) above, the preesnt strontium carbonate is relatively free of impurities. Substantially all of the objectionable impurities, such as iron, silica, alumina and the like, are eliminated during the intervening steps. This strontium carbonate may be referred to as pure strontium carbonate.

It is next desired to convert the pure strontium carbonate to a substantially pure strontium oxide, that may be readily converted to strontium peroxide. To this end the pure strontium carbonate is mixed with a suitable reducing agent, such as with an equimolecular proportion of ashless carbon. The carbonaceous reducing agent should preferably contain approximately 8.3% of active reducing carbon, so that there may be no unburnt carbon present when all of the strontium carbonate is reduced to strontium oxide, and so that there may be no, or as little as possible, decomposition of strontium carbonate to strontium oxide by heat alone. When subjected to appropriate reduction temperatures, the heated mixture of strontium carbonate and carbonaceous reducing agent is converted to strontium oxide and carbon monoxide, in conformity with the equation:

(7)    $SrCO_3 + C = SrO + 2CO$

The reaction represented by this equation is similar to the one indicated in equation (2) above, except that much purer materials enter into the later reaction. The reduction operation just indicated must be very carefully conducted in a closed muffle type furnace of sufficiently gas tight construction to retain an atmosphere of carbon monoxide from the gas liberated by the reaction in order to obtain a final strontium oxide product that may be oxidized to strontium peroxide without any undue difficulty.

The relatively pure strontium oxide obtained by the last reduction reaction is next converted to relatively pure strontium peroxide. This conversion is preferably performed in accordance with the method disclosed in my United States Letters Patent No, 1,325,043. According to the practice of the invention therein disclosed, the strontium oxide is made to react with free oxygen while heated to a temperature of 400–500° C., and while under about 1300 lbs. pressure per square inch:

(8) $\quad 2SrO + O_2 = 2SrO_2$

As a result of this oxidizing operation, from 85 to 90% of the strontium oxide is converted to strontium peroxide. The remainder of the product is largely composed of strontium oxide and strontium carbonate, since extraneous impurities, such as iron, silica, alumina, etc., were previously eliminated.

The strontium peroxide is next converted into hydrogen peroxide by the use of suitable acids or mixture of acids. In the present preferred practice of the invention, I employ a mixture of sulfuric and phosphoric acids. As a result of the reaction precipitates of strontium sulfate and strontium phosphate, and liquid hydrogen peroxide, are formed, according to the equations:

(9) $\quad SrO_2 + H_2SO_4 = SrSO_4 + H_2O_2$

(10) $\quad 3SrO_2 + 2H_3PO_4 = Sr_3(PO_4)_2 + 3H_2O_2$

In order to obtain a substantially pure hydrogen peroxide free from soluble salts, I have found it advantageous to use a mixture of acids comprising about 10% phosphoric and 90% sulphuric acids. During the course of the reaction, the reaction mass must be kept relatively cool. The strontium peroxide is first slaked in water to obtain a thin paste of strontium peroxide. This paste is slowly added to the agitated mixture of acids in order to prevent zones of local alkalinity forming in the reaction mass. Such zones of local alkalinity tend to cause decomposition of the hydrogen peroxide.

The alkaline paste of strontium peroxide is added to the acid mixture until the solution is nearly neutralized, the temperature of the reaction mass being kept relatively cool. The strontium sulfate and strontium phosphate crystals precipitate out. The liquid portion of the resulting pulp mixture is decanted from the precipitate, and may be subjected to various treatment processes in order to remove any impurities, if present, usually by rendering it sufficiently alkaline for the purpose. The liquid hydrogen peroxide is then rapidly forced through a filter-press in order to remove any solids. The filtered liquid represents the commercial hydrogen peroxide product.

The strontium sulfate and strontium phosphate precipitates, obtained from the reactions (8) and (9) above, are washed free of liquid hydrogen peroxide. Due to the relative amounts of acids originally employed, the precipitate will be composed of approximately 90% strontium sulfate and 10% strontium phosphate. The combined precipitates are then treated with an excess of sulfuric acid to remove the acid soluble strontium phosphate, according to the following reaction:

(11) $\quad Sr_3(PO_4)_2 + 3H_2SO_4 = 3SrSO_4 + 2H_3PO_4$

The effect of this reaction is to convert the strontium phosphate to strontium sulfate and phosphoric acid. The excess sulfuric acid, containing the regenerated phosphoric acid, gathers as a top liquor, and may be readily decanted. The strontium sulfate precipitate is washed several times with water to remove the sulfuric and phosphoric acids as completely as possible. These wash liquors are added to the top layer of liquor decanted. Suitable additions of sulfuric acid may be made to this mixture of decanted and wash liquors in order to treat a new batch of strontium peroxide. The total effect is to regenerate the phosphoric acid, which may be used over and over again in the practice of the invention. This is a very desirable economy because of the high cost of phosphoric acid. On the other hand, the strontium sulfate recovered in this operation is a valuable by-product, and may be suitably recovered for commercial usage.

The strontium sulfate obtained by the reaction (10) above is preferably filtered, and employed for the preparation of more strontium peroxide. To this end, it may itself be subjected to the soda ash treatment outlined above, or it may be suitably mixed with celestite about to be subjected to the practice of the invention. Since there is no substantial loss of strontium throughout the whole process, the strontium sulfate may be used over and over again to make hydrogen peroxide. Whatever slight losses of strontium result in the practice of the invention may be made up by suitable additions of relatively small amounts of celestite at the beginning of the process.

If, as is often the case, the weak hydrogen peroxide is to be concentrated to a 27.0% $H_2O_2$ content, a more advantageous procedure is to add just enough strontium peroxide in equations (9) and (10) to selectively react with the sulphuric acid, thereby substantially avoiding reaction with the phosphoric acid. The resulting products then are a precipitate of strontium sulfate, practically uncontaminated with strontium phosphate, and top liquor containing hydrogen peroxide and phosphoric acid. The hydrogen peroxide may be completely distilled under high vacuum, say not less than 25" of mercury, from the phosphoric acid. A suitable apparatus for carrying out the distillation has been found to be one of glass lined iron.

The products of the distillation then are a distillate of highly pure hydrogen peroxide of approximately the strength of the original top liquor, and the residue remaining in the still is phosphoric acid. The weak hydrogen peroxide may now be concentrated to give a 27.0% solution, under vacuum as noted above, except that the distillation is stopped when the hydrogen peroxide in the still reaches 27.0%. About 85% remains as a 27% solution, and about 15% passes over in the distillate. This distillate may be recombined with the residual phosphoric acid from the first distillate. Sulphuric acid may next be added to the mixture and more weak hydrogen peroxide prepared according to equations (9) and (10) above.

While sulfuric and phosphoric acids have been indicated as the preferred acids to be employed in the practice of the invention, to obtain a substantially pure hydrogen peroxide product uncontaminated with soluble salts, other acids, either alone or in conjoint use with other acid or acids, might be employed for the same purpose. For example, such acids as hydrofluoric, silicofluoric, borofluoric in substantially the proportions indicated for phosphoric might also be employed. On the other hand, if the presence of soluble strontium salts in the final hydrogen peroxide is not objectionable for certain commercial applications, other acids, such as muriatic or nitric may be used.

In case hydrofluoric acid is used, it can be substantially completely recovered by treating the mixture of strontium sulfate and strontium fluoride with concentrated sulfuric acid and heating, the hydrofluoric acid being thus liberated and volatilized in accordance with the following reaction:

(12) $SrSO_4 + SrF_2 + H_2SO_4 = 2SrSO_4 + 2HF$ and may be recovered by condensation; or, the combined precipitates of strontium sulfate and strontium fluoride may be treated with an alkali metal compound, such as concentrated sodium carbonate solution, when the strontium fluoride will be converted to strontium carbonate and sodium fluoride, according to the following reaction:

(13) $SrF_2 + Na_2CO_3 = SrCO_3 + 2NaF$ and the strontium sulfate will also be converted to strontium carbonate as in equation (1).

The top liquor will therefore consist of a concentrated solution of sodium sulfate containing a small amount (not over 10% of the sodium sulfate present) of sodium fluoride, which may be converted to a substantially water soluble compound such as sodium sulfate, by treating the liquor with an excess of a suitable alkali earth, such as calcium sulfate, when the following reaction will take place:

(14) $2NaF + CaSO_4 = Na_2SO_4 + CaF_2$

The calcium fluoride being insoluble in water and the calcium sulfate being very difficulty soluble, therefore, both the calcium fluoride and the excess calcium sulfate separate out as precipitates, and the clear pure sodium sulfate liquor may be decanted off.

By treating the precipitated calcium fluoride with concentrated sulfuric acid and heating, the hydrofluoric acid may be recovered and calcium sulfate obtained, both of which may be used again.

(15) $CaF_2 + H_2SO_4 = CaSO_4 + 2HF$

Viewing the practice of the invention in retrospect, it will be observed that the net result is to effect the manufacture of hydrogen peroxide, by the fixation of oxygen. This result is obtained by using strontium oxide as an oxygen carrier. Soda ash, carbon and sulfuric acid are employed as auxiliary raw materials. Strontium sulfate, phosphoric or hydrofluoric acids are each regenerated, except for certain mechanical losses that may total from 10 to 20%.

Moreover, certain valuable by-products are also obtained—more especially sodium sulfate. Carbon monoxide resulting from the reduction operations is converted to carbon dioxide, and employed as a carbonating agent.

Because of the regeneration of the very valuable strontium sulfate, which is substantially pure, and the phosphoric acid, the invention may be practiced with considerable economy. Moreover, the process lends itself particularly well to the manufacture of a final hydrogen peroxide product that is substantially pure.

I claim:

1. The method of manufacturing hydrogen peroxide which comprises bringing together strontium peroxide and an appropriate mixture of sulfuric acid and phosphoric acid whereby there are formed hydrogen peroxide, strontium sulfate and strontium phosphate, separating the liquid hydrogen peroxide portion from the precipitate of strontium sulfate and strontium phosphate, and converting the strontium phosphate to phosphoric acid and strontium sulfate.

2. The method of manufacturing hydrogen peroxide which comprises suitably converting strontium sulfate to relatively pure strontium peroxide, bringing together said strontium peroxide and a mixture of sulphuric acid and phosphoric acid while maintaining the reaction mass at a relatively low temperature to form hydrogen peroxide, strontium sulfate and strontium phosphate, separating the liquid hydrogen peroxide from said strontium salts regenerating phosphoric acid from said strontium phosphate by means of sulfuric acid, and employing the strontium sulfate so recovered for the formation of more strontium peroxide.

3. The method of manufacturing hydrogen peroxide which comprises, treating strontium sulphate with soluble carbonate to form strontium carbonate, converting the strontium carbonate to strontium oxide, oxidizing the strontium oxide to strontium peroxide, treating the strontium peroxide with sulphuric acid to form hydrogen peroxide and strontium sulphate, separating the strontium sulphate from the hydrogen peroxide and returning the strontium sulphate to the process.

4. A process according to claim 3, in which the sulfuric acid solution contains a small amount of phosphoric acid.

5. A process according to claim 3, in which the strontium carbonate is converted to crude strontium oxide, leaching the crude oxide with water to obtain pure strontium hydroxide, and then converting the strontium hydroxide to strontium oxide.

6. A process according to claim 3, in which the strontium carbonate is heated in the presence of a carbonaceous reducing agent to form crude strontium oxide and carbon monoxide, oxidizing the carbon monoxide to carbon dioxide, leaching the crude strontium oxide with water to form strontium hydroxide, carbonating the strontium hydroxide to form pure strontium carbonate, said carbon dioxide being utilized in said carbonation operation, and converting the pure strontium carbonate to pure strontium oxide.

JAMES B. PIERCE, Jr.